(No Model.)
A. LEARMONTH & A. A. BELTMAN.
SEED PLANTER.
No. 491,363. Patented Feb. 7, 1893.
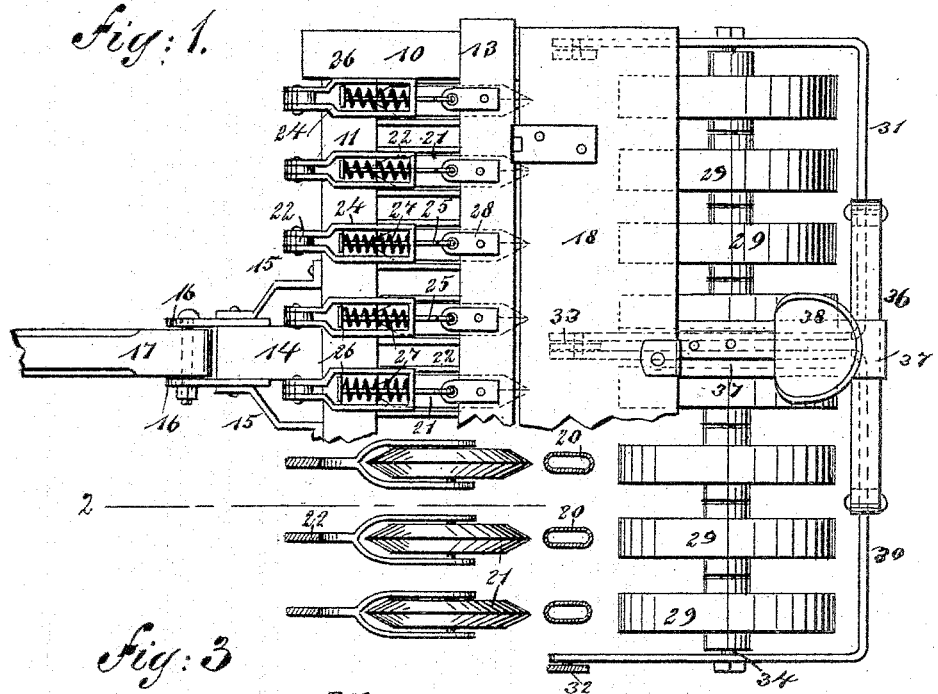
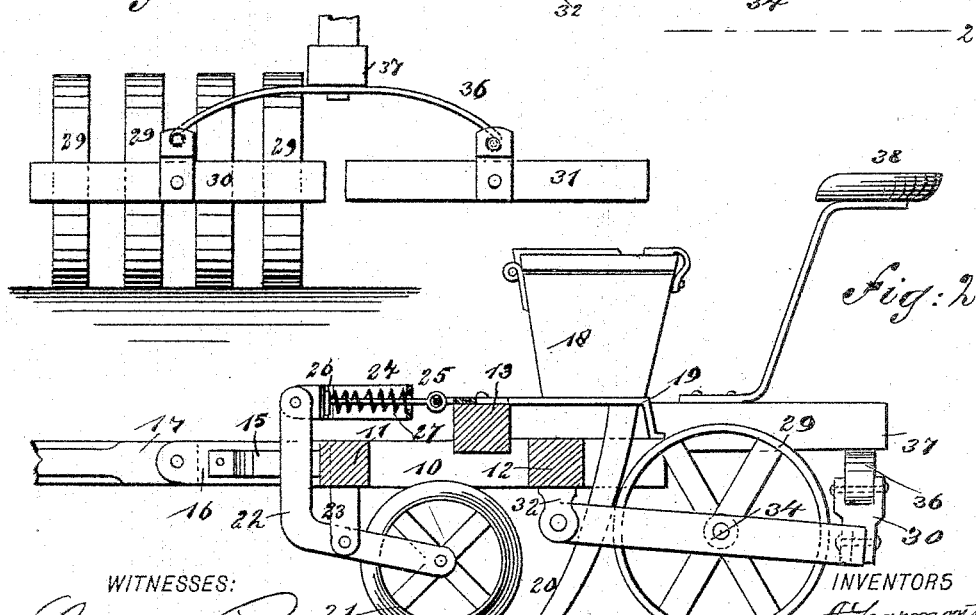

UNITED STATES PATENT OFFICE.

ALEXANDER LEARMONTH AND ARNOLD A. BELTMAN, OF TOWER CITY, NORTH DAKOTA.

SEED-PLANTER.

SPECIFICATION forming part of Letters Patent No. 491,363, dated February 7, 1893.

Application filed April 15, 1892. Serial No. 429,315. (No model.)

*To all whom it may concern:*

Be it known that we, ALEXANDER LEARMONTH and ARNOLD A. BELTMAN, of Tower City, in the county of Cass and State of North Dakota, have invented a new and useful Improvement in Seed-Planters, of which the following is a full, clear, and exact description.

The invention is an improvement in the class of seed planters having furrowing wheels, which are mounted in elastic, or spring, bearings.

The invention consists in the novel construction and combination of the several parts, as will be hereinafter fully set forth and pointed out in the claim.

Reference is to be had to the accompanying drawings forming a part of this specification, in which similar figures of reference indicate corresponding parts in all the views.

Figure 1 is a plan view of the implement, a portion thereof being in horizontal section; Fig. 2 is a section taken practically on the line 2—2 of Fig. 1; and Fig. 3 is a partial rear elevation of the implement.

In carrying out the invention the implement constructed of two side bars 10, which are connected at the front by a cross bar 11 and near the rear by a second cross bar 12, a third cross bar 13, being also attached to the side bars; the latter cross bar, however, rests upon, or is slightly introduced into the upper portions of the side bars of the frame. At the center of the front of the frame a slight extension 14, is made, supported by suitable brackets 15, located one at each side of the extension and attached to the frame. From this extension straps 16, are forwardly projected, and between these straps the inner end of the pole 17, is pivoted, or the pole may be pivoted to the frame of the implement in any other suitable or approved manner.

The seed box 18, is located upon the top of the frame, and extends from side to side thereof, being supported by suitable brackets 19 attached to the sides and likewise to the upper cross bar 13; or the attachment between the seed box and the frame may be made in any other desired manner. The construction of the seed box is immaterial, as is also the manner in which the seeds are delivered to the conducting or distributing chutes 20, a number of which are employed as shown in Fig. 1, the said chutes being in direct communication with the seed box and extending downward in a direction to deliver seed to the ground. Preferably these chutes are forwardly curved.

In front of each of the chutes 20 a wheel 21, is located, adapted to create a trough or furrow for the reception of the seed to be planted. These wheels are made as light as in practice may be deemed advisable, but in all cases their peripheral surfaces are beveled from the sides in direction of the center, rendering the said surfaces more or less V-shaped in cross section as illustrated in Figs. 1 and 2. Each wheel has an independent bearing, and the bearings 22 of the wheels are somewhat L-shaped or angular in general contour, the lower members of the bearings receiving the trunnions or axles of the wheels, and these members are fulcrumed upon studs 23, projected preferably from the front cross bar 11 of the frame, and each bearing is pivotally connected with the skeleton frame 24, which frame is preferably made somewhat rectangular in general shape.

Within each frame a plunger 25, is held to slide, the said plunger consisting of rods which pass through apertures in the rear of the frame, the inner ends of the rods having heads 26, formed thereon, and each rod is surrounded by a spring 27, which bears against the head of the rod around which it coils and also against the inner face of the rear end of the skeleton frame in which the rod has movement. The rods 25, extend beyond the skeleton frames rearwardly, and are pivotally connected with straps or metal supports 28, secured to the upper cross bar 13. By this construction it will be observed that the wheels 21 are normally held down in such manner as to bear with considerable force upon the ground over which they are to pass. This force is necessary in order that the wheels may penetrate and produce a trough or furrow in the ground for the reception of the seed from the chutes 20 immediately following the wheels. This pressure is exerted by the springs 27, but in the event that the wheels 21 should encounter any obstacles they are free to rise to pass over the same, though the moment that the obstacles are cleared the wheels will resume their normal position and will continue the furrow or trough.

To form a complete machine, we employ, in connection with the parts before described, transporting and seed-covering wheels 29, which are arranged in rear of the seed chutes 20 as shown in Fig. 1. These wheels 29 are mounted on axles 34 having their bearings in rectangular or angle shaped frames 30 and 31, which are pivoted at their forward ends 32, 33, to the rear portion of the frame of the machine. These two frames 30 and 31 are connected by a bow (plate) spring 36, which supports a beam 37 which carries the driver's seat 38 and whose forward end is connected with the main frame.

Having thus described our invention, we claim as new and desire to secure by Letters Patent,—

In a seed-planter, the combination, with the frame and seed-conducting chutes of the furrow wheels 21, the L-shaped bearings, 22, pivoted to pendent studs, and the spring-tension attachments connecting the upper arms of said bearings with the portion of the frame in rear of them, as shown and described.

ALEXANDER LEARMONTH.
ARNOLD A. BELTMAN.

Witnesses:
JOHN WAREM,
H. V. SMITH.